United States Patent
Inada et al.

(10) Patent No.: US 6,470,985 B1
(45) Date of Patent: *Oct. 29, 2002

(54) GENERATOR CONTROL DEVICE FOR AN ELECTRICAL AUTOMOBILE

(75) Inventors: Eiji Inada, Yokohama; Shinichiro Kitada, Tokyo; Toshio Kikuchi, Yokosuka; Hiroyuki Hirano, Kanagawa; Takeshi Aso, Zushi; Ryuichi Idoguchi, Yokohama; Yutaro Kaneko, Yokosuka, all of (JP)

(73) Assignee: Nissan Motor Co., Ltd., Yokohama (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/148,701

(22) Filed: Sep. 4, 1998

(30) Foreign Application Priority Data

Sep. 5, 1997 (JP) ............................................. 9-241007

(51) Int. Cl.⁷ ............................................... B60K 13/04
(52) U.S. Cl. ...................... 180/65.3; 180/65.4; 180/309
(58) Field of Search ............................. 180/65.1, 65.2, 180/65.4, 309, 65.3, 65.6; 701/22; 74/862, 866; 477/43, 44, 46

(56) References Cited

U.S. PATENT DOCUMENTS

| | | | | |
|---|---|---|---|---|
| 3,719,881 A | * | 3/1973 | Shibata et al. ................. 180/65 |
| 4,335,429 A | * | 6/1982 | Kawakatsu ................. 180/65.4 |
| 4,671,138 A | * | 6/1987 | Nobumoto et al. ........... 74/862 |
| 4,951,769 A | * | 8/1990 | Kawamura ................. 180/65.4 |
| 5,212,431 A | * | 5/1993 | Origuchi et al. ........... 180/65.4 |
| 5,264,764 A | * | 11/1993 | Kuang ........................ 180/65.4 |
| 5,323,868 A | * | 6/1994 | Kawashima ............... 180/65.4 |
| 5,566,774 A | * | 10/1996 | Yoshida ..................... 180/309 |
| 5,575,737 A | * | 11/1996 | Weiss .......................... 477/44 |
| 5,713,814 A | * | 2/1998 | Hara et al. ................. 180/65.2 |
| 5,821,706 A | * | 10/1998 | Koga .......................... 318/139 |

FOREIGN PATENT DOCUMENTS

JP 5-328528 12/1993

* cited by examiner

Primary Examiner—Brian L. Johnson
Assistant Examiner—Hau Phan
(74) Attorney, Agent, or Firm—Foley & Lardner

(57) ABSTRACT

An engine is activated to drive a generator when an electrical output is required. The required electrical output (PO) is searched and the necessary engine output is calculated. The basic driving point (NO, TO) which obtains maximum fuel efficiency is set at that output (S101–S105). The load of the generator is controlled so as to reach the set basic driving point. When the catalyst temperature is lower than a set value, while maintaining the required electrical output, the basic driving point is varied to a driving point (Ncold, Tcold) which will raise the exhaust gas temperature (S106–108). Furthermore when the temperature of the peripheral engine components in the engine room is higher than a set value, while maintaining the required electrical output, the driving point is varied to a driving point (Nheat, Theat) which will lower the exhaust gas temperature (S109–S111). Hence while maintaining the electrical output, it is possible satisfy each component temperature condition. Therefore while maintaining drivability, fuel efficiency performance, lowering exhaust gas emissions and component deterioration can suppressed.

16 Claims, 9 Drawing Sheets correlation of engine room temperature and engine exhaust gas

GENERATOR CONTROL DEVICE FOR AN ELECTRICAL AUTOMOBILE

The contents of Tokugan Hei 9-241007, with a filing date of Sep. 5, 1997 in Japan, is hereby incorporated by reference.

FIELD OF THE INVENTION

The present invention relates to a generator control device used in a hybrid electrical automobile.

BACKGROUND TO THE INVENTION

An electrical automobile provided with an electrical generator and an engine for driving an electrical generator is termed a series hybrid electrical vehicle (SHEV). Such a vehicle runs by driving the electrical motor with energy from the battery when the charge of the battery is above a set level. When the charge of the battery is low, the engine is activated and electricity is produced by the electrical generator. The electrical energy drives the electrical motor and at the same time charges the battery. When the battery charge reaches a fixed value, the engine is stopped in order to stop generation of energy.

The amount of energy generated by the generator increases with respect to increases in the output of the engine which drives it.

However in order to decrease emissions of toxic exhaust emissions from the engine of the series hybrid electrical vehicle, a catalyst is provided in the engine exhaust system. As described above, the engine is often stopped even if the automobile is running. As a result the engine will have a low temperature immediately after it is operated. The catalyst will thus be inactive and purification of the exhaust gases will not be efficient.

In this context, JP-A-5-328528 teaches that immediately after engine activation, the engine output is set to twice the required output which increases the flow of exhaust gases. By doing so, the catalyst temperature reaches activation temperature in a short time.

However controlling the engine output to double the required output entails the danger of damaging the battery due to excess charging by the generator.

Furthermore, as the engine speed increases, engine noise will appear to increase when the vehicle is stopped or running at a low speed. This will make the driver uneasy. Further it is not desirable that the total amount of exhaust gases output from the engine is increased to such a degree.

SUMMARY OF THE INVENTION

It is an object of the present invention to realize early catalyst activation and provide for the thermal protection of peripheral engine components not only by efficient driving so that the generator generates enough to charge the battery but also by variation of the driving point on the basis of demanded exhaust gas temperature.

In order to achieve this object, the electrical generator control device of the electrical automobile of the present invention is provided with an electrical motor for driving the vehicle, a battery to supply electrical power to the electrical motor, a generator for supplying electrical energy to the electrical motor as well as the battery, an engine to drive the generator, and a controller which controls the output of the engine so that, at least when the charge of the battery is below a set level, the generator is driven and the amount of electrical energy produced meets the required level.

The controller is constituted by a micro-computer and functions on the basis of the following program. The load of the generator is controlled so that an efficient engine rotation speed is achieved at that engine output. The required conditions of the engine exhaust gas temperature are judged. When required conditions of the engine exhaust gas temperature differ from the exhaust gas temperature at the present driving conditions, while maintaining the same engine output, the generator load is varied to change the rotation speed of engine so that an exhaust gas temperature results that corresponds to the required temperature.

The details as well as other features and advantages of the invention are set forth in the remainder of the specification and are shown in the accompanying drawings.

THE PREFERRED EMBODIMENTS OF THE INVENTION

The preferred embodiments of the invention will be explained with reference to the accompanying figures.

Figure 1:
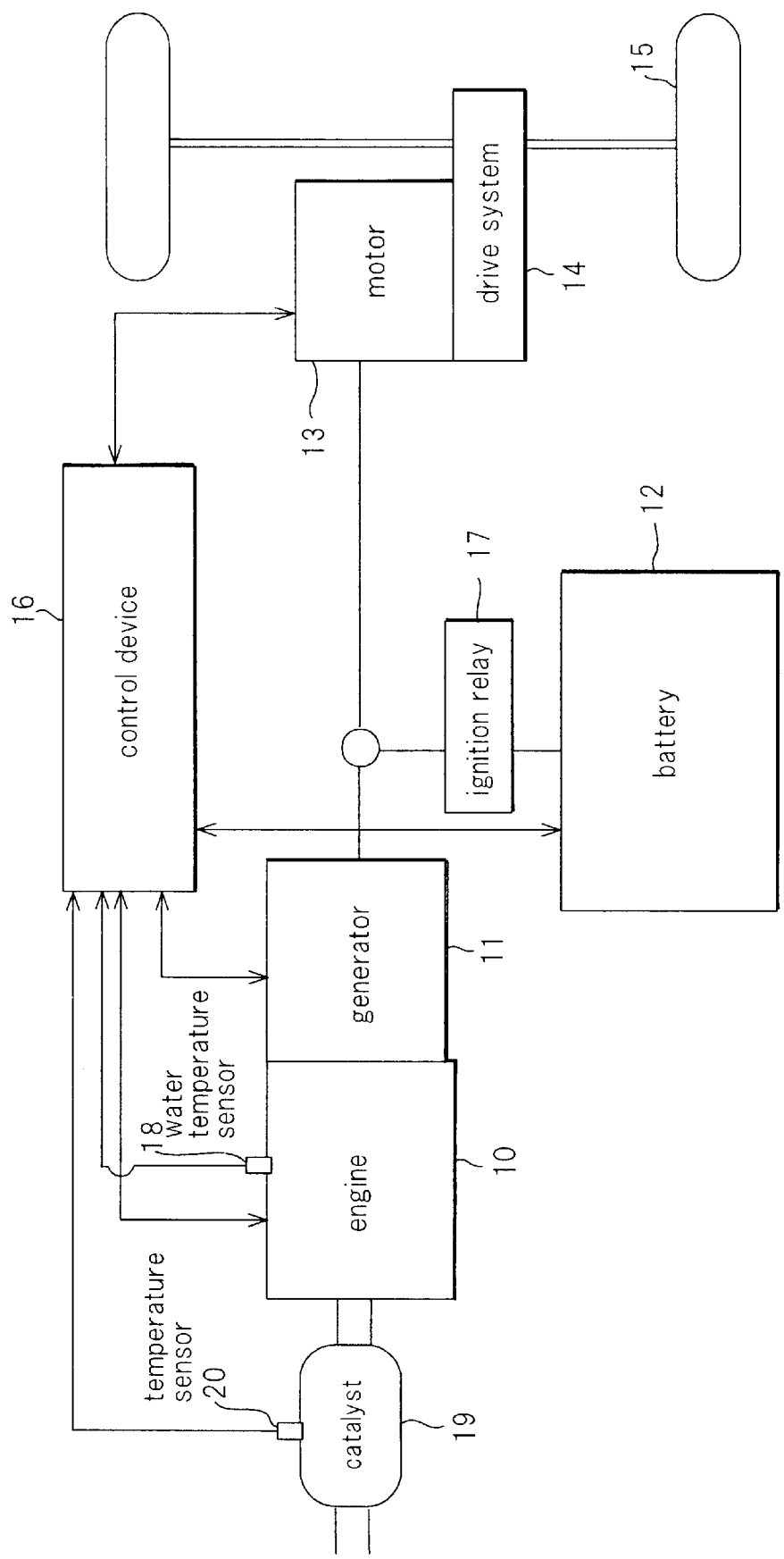
FIG. 1 shows a system representing a first embodiment of the present invention.

FIG. 1 shows the schematic construction of a series hybrid electrical vehicle (SHEV). In the FIG. 1, reference numeral 10 denotes an engine to drive a generator, 11 is a generator which is driven by the engine 10 and generates electricity, 12 is a battery which stores generated energy and supplies same to the motor explained hereafter, 13 is an electrical motor used to drive the vehicle and regenerating energy when the vehicle is at a reduced speed, 14 is a drive device such as a reduction gear or a transmission which transmits the output of the electrical motor 13 to the vehicle wheel, 16 is a control device which controls the movement of the above.

The motor 13 used to drive the vehicle is supplied with electrical energy by one or both of the battery 12 and the generator 11. When the energy for required output of the motor 13 is in the battery 12, that is to say, when the battery 12 has a sufficient charge, the motor 13 is driven by the energy of the battery 12 and the engine 10 which drives the generator 11 is stopped.

When the energy of the battery 12 does not satisfy the required output of the motor 13 or when the charge amount falls below a fixed value, the engine 10 is driven and electricity is generated by the generator 11. This electricity is supplied to the motor 13 and at the same time the battery 12.

When the charge amount of the battery 12 reaches the required output of the motor 13, or when the battery 12 reaches a fixed charge, the engine is stopped and generation of electricity is terminated.

The control device 16 controls the rotation of the motor 13 corresponding to the signals such as those from the accelerator pedal (not shown). The control device controls the activation of the engine 10 used to drive the generator depending on the charge of the battery 12, the regulation of the engine output and its termination. At the same time, the control device 16 controls the generating load of the generator 11. It places the input and output relay of the battery 12 in the ON/OFF position and controls the charge of the battery 12.

A water temperature sensor 18 which detects the temperature of water coolant in the engine is mounted in the engine 10. A catalyst 19 in a purification system is provided in the exhaust gas pipe of the engine 10. A temperature sensor 20 is mounted in the catalyst 19. Detected signals from the water temperature sensor 18 and the temperature sensor 20 are read by the control device 16 which performs respective control.

As described above, the control device 16 controls the operation of the engine 10 and the generator 11 depending on the required output of the motor 13 and the charge of the battery 12 based on each detected signal so that the required output is generated to create optimal driving efficiency (fuel efficiency). However problems arise that the catalyst 19 is inactive just after engine activation or the temperature of the engine periphery increases excessively and an adverse thermal effect is placed on peripheral engine components.

In such cases, while minimizing engine inefficiency, the control device 16 controls the load of the generator 11 or the output of the engine 10, as discussed below, in order to increase the exhaust gas temperature to activate the catalyst or in order to reduce the exhaust gas temperature to reduce the thermal effect on the peripheral engine components.

Before explaining the content of the control of the control device 16, it is necessary to consider the load of the generator 11 and the output characteristics of the engine 10.

Figure 2A:
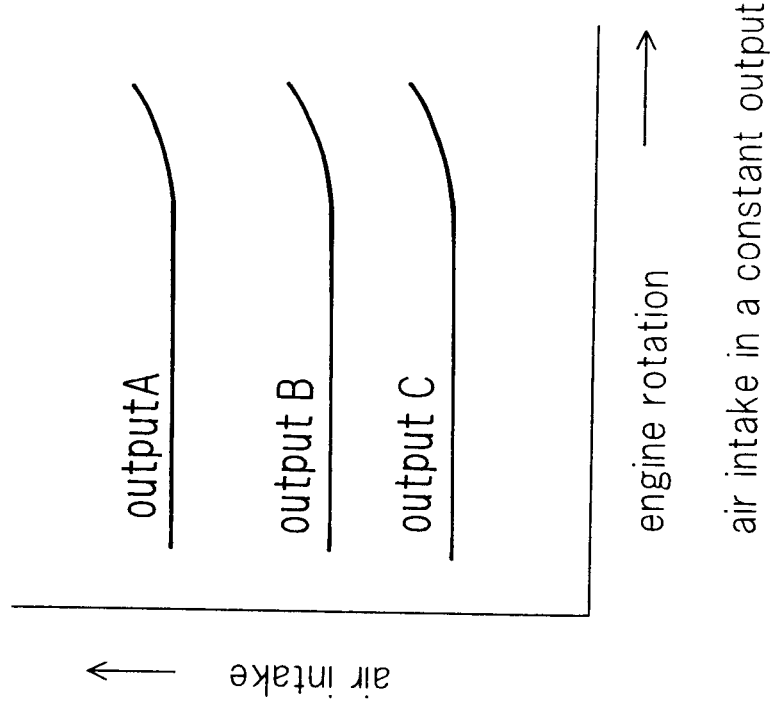
FIG. 2(A) shows equal output and equal air intake with engine rotation speed on the horizontal axis and engine load (torque) on the vertical axis. (B) shows the relationship between the air intake and engine rotation speed at each output based on (A).

FIG. 2(A) expresses the air intake and engine output based on engine rotation speed and engine torque. The electrical output of the generator 11 equals engine output. Engine torque corresponds to the motive torque of the generator 11. This agrees with the motive resistance of the generator, in other words, it corresponds to the generator output current value or the terminal voltage.

When engine output is constant, a change in engine torque changes the engine rotation speed. The rotation speed of the generator also changes but the amount of electricity produced remains constant.

Figure 2B:
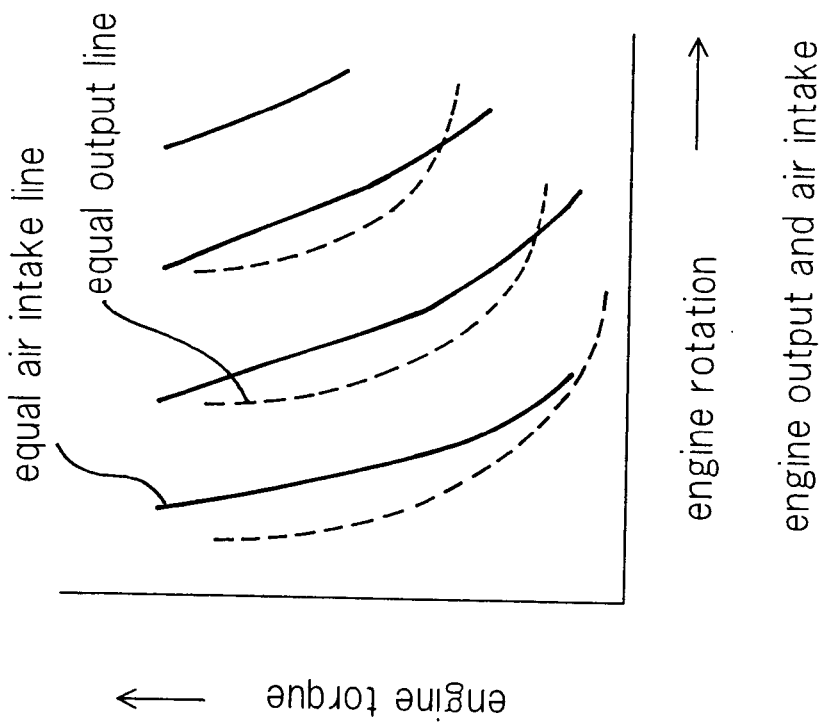

FIG. 2(B) shows the relation expressed in FIG. 2(A) on the basis of engine rotation speed and air intake amount when the engine output is held constant.

As is clear from these Figures, when the same engine output is maintained (that is to say the same electrical output), even if the engine rotation speed is changed, the air intake amount is roughly unchanged and is roughly fixed.

Figure 3A:
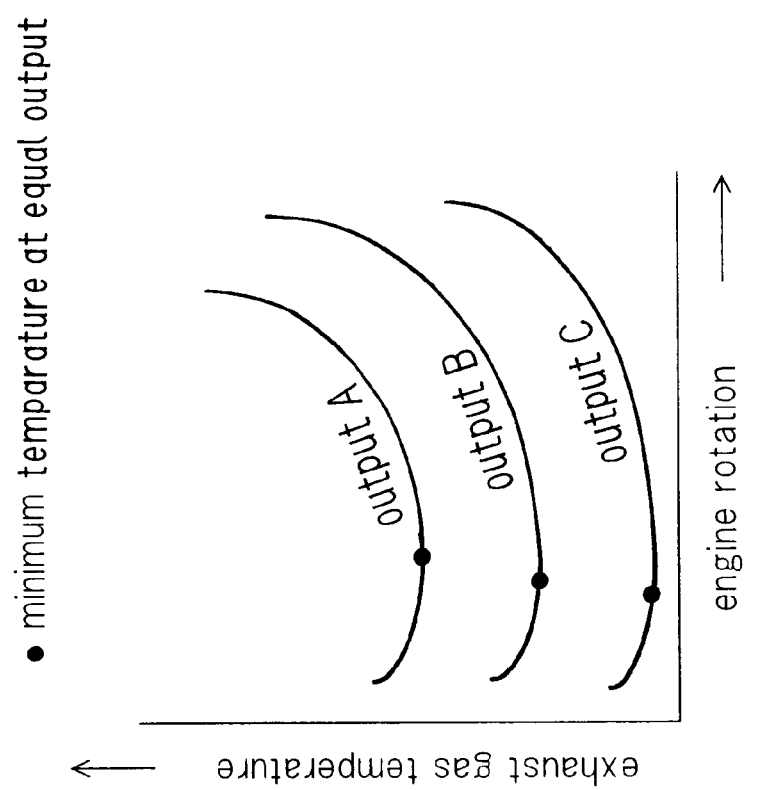
FIG. 3(A) shows equal output and equal exhaust gas temperature with engine rotation speed on the horizontal axis and engine load on the vertical axis, in the same way, (B) shows the relationship between the engine rotation speed at each output and exhaust gas temperature based on (A).

FIG. 3(A) expresses the relation of engine output and exhaust gas temperature based on engine rotation speed and engine load.

Figure 3B:
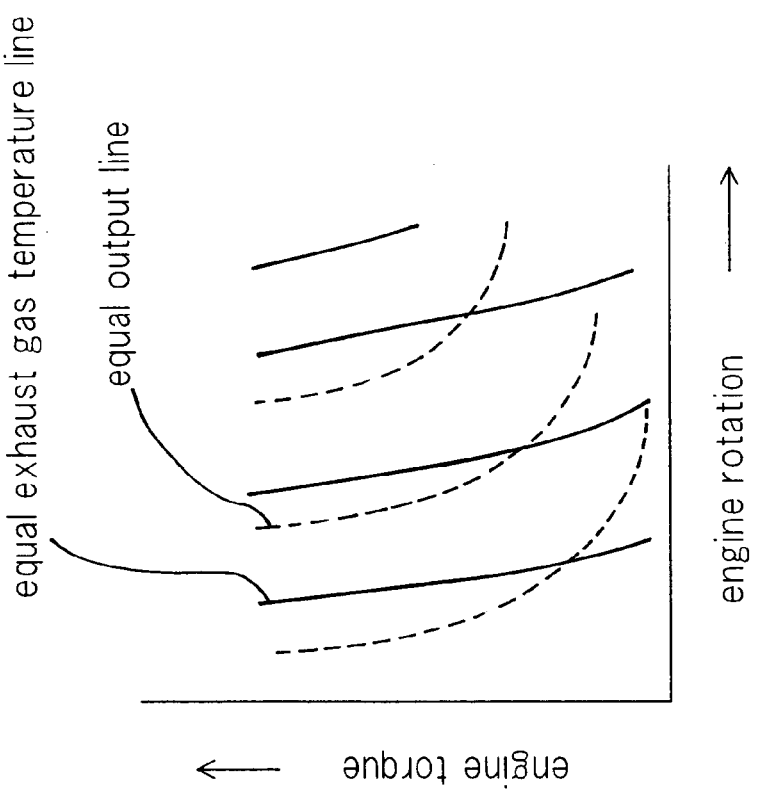

FIG. 3(B) expresses the relationship of engine rotation speed and exhaust gas temperature when engine output is held constant.

As can be understood from the Figures, when output is held constant, there is a tendency for exhaust gas temperature to increase when engine rotation speed is increased. However there is a region wherein exhaust gas temperature increases when engine rotation speed decreases beyond a certain point. Hence even if the electrical output is constant, if generator torque is changed and engine rotation speed is varied, exhaust gas temperature can be increased or decreased by the engine rotation speed.

Figure 4A:
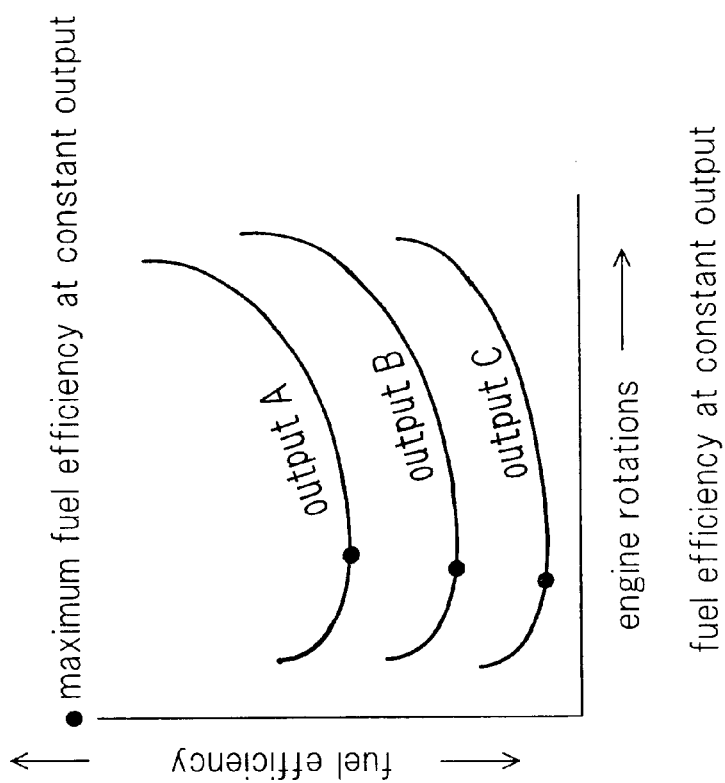
FIG. 4(A) shows equal output and equal fuel consumption with engine rotation speed on the horizontal axis and engine load on the vertical axis. In the same way, (B) shows the relationship between engine rotation speed at each output and fuel consumption based on (A)

FIG. 4(A) expresses the engine fuel consumption characteristics as based on engine rotations and engine load. When engine rotation speed is in the range of 2000–4000 RPM, the higher the torque, the better the fuel consumption is.

Figure 4B:
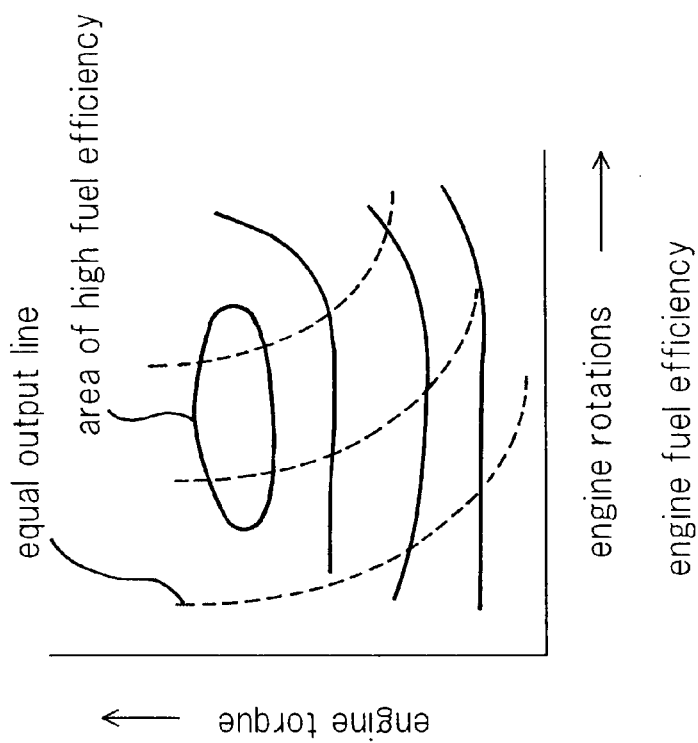

FIG. 4(B) changes the relation expressed in FIG. 4(A) to engine rotation speed and fuel efficiency with respect to the same engine output. From FIG. 4(B), it can be seen that when the same engine output is maintained, fuel efficiency decreases when engine rotation speed is increased and below a certain rotation speed fuel efficiency decreases.

Figure 5:
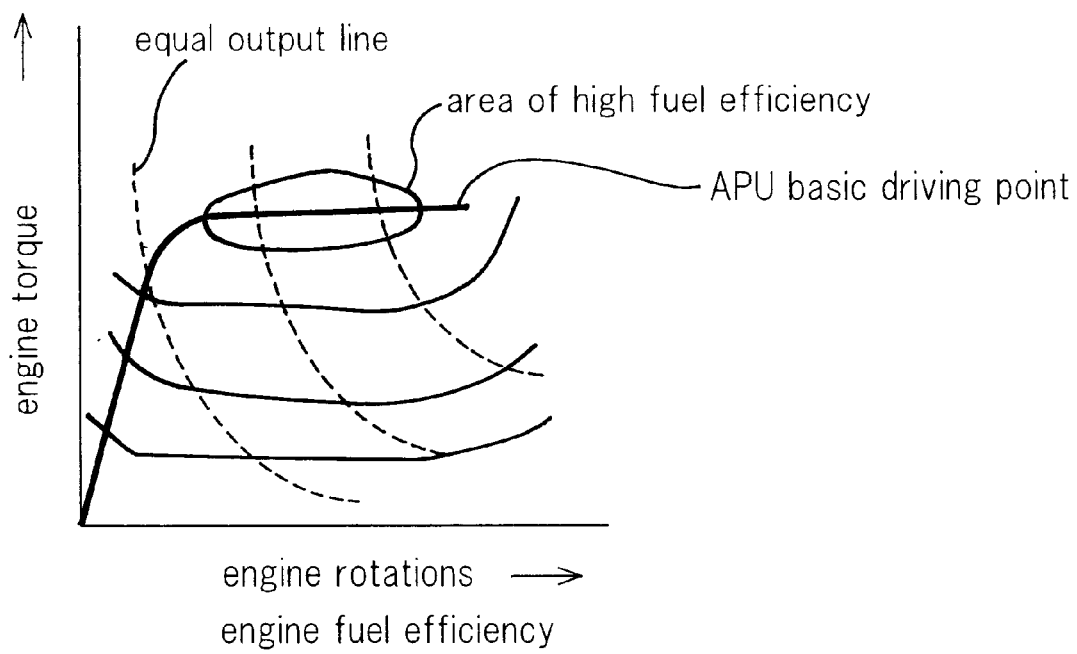
FIG. 5 shows the curve joining driving points (APU basic driving points) representing maximum fuel efficiency at each output with engine rotation speed on the horizontal axis and engine load on the vertical axis.

As can be understood from the above, in order to drive at optimal engine efficiency, driving should proceed while searching for high efficiency conditions at each engine output (each generator output) while adjusting the load of the generator 11. The solid line in FIG. 5 shows the high efficiency basic driving characteristic (APU) of the engine 10.

Hence when the exhaust gas temperature is basically not limited, the control device 16 regulates driving of the engine 10 to a point of optimal efficiency (APU basic driving point) while controlling the load of the generator 11. Such control can be outlined as follows.

When generator output is determined from the output characteristics required by the motor 13, engine output is determined on that basis. The engine output is used to calculate engine rotation speed and torque in agreement with APU characteristics. Since engine output is determined depending on air intake, the degree of aperture of the throttle valve which regulates air intake is determined. When air intake is held constant, engine torque (load) increases and rotation speed decreases.

Engine torque corresponds to generator torque. As a result, if the torque of the generator 11 is varied, the engine rotation speed varies. The torque of the generator 11 varies depending on the control of the output current value or the terminal voltage. The electrical output of the generator 11 is determined by the torque of the generator 11 and the rotation speed. Hence even if torque is reduced and the rotation speed is increased, it is possible to maintain the same electrical output.

In this way, it is possible to drive the engine 10 in a state of optimal fuel efficiency and obtain the same electrical output by varying the engine output speed while controlling the generator torque.

Figure 6:
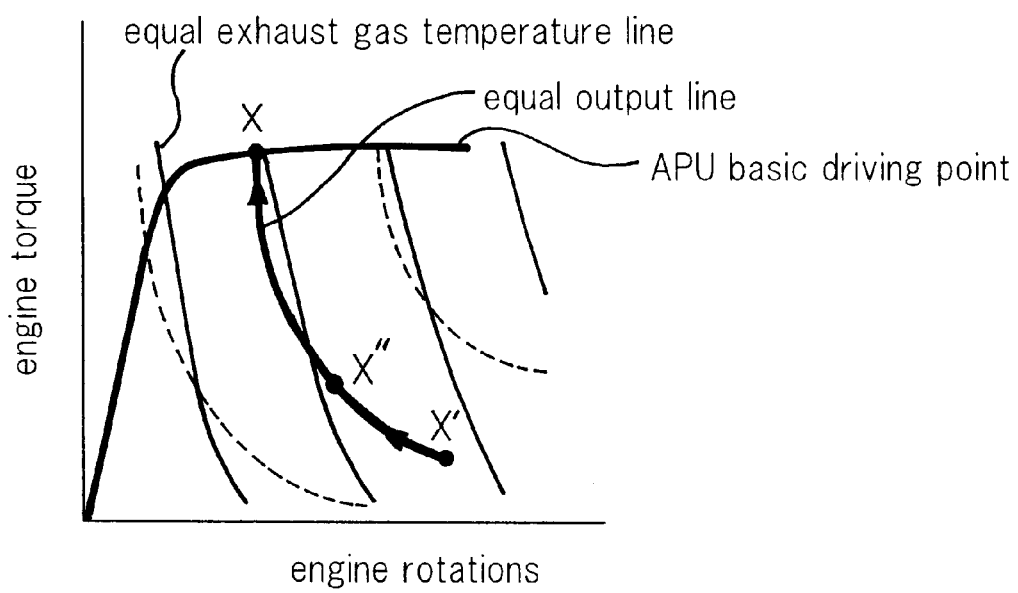
FIG. 6 shows the transition line (X'→X"→X) of the driving point of the generator and the engine used to drive the generator when the catalyst has a low temperature (period of inactivation).

FIG. 6 shows the driving point of the engine 10 when the catalyst 19 has low exhaust gas purification capability due to a low temperature.

As shown above, it is possible to define the basic driving point APU on the basic driving line shown in FIG. 5 once the required electrical output is determined. However when the catalyst 19 has a low temperature, the exhaust gas will not be purified and a large amount of toxic exhaust gas emissions will be output as a result. Therefore it is necessary to raise the temperature of the catalyst 19 as soon as possible. In these conditions the exhaust temperature condition of the engine is relatively high.

As shown in FIG. 3, the exhaust gas temperature characteristics of the engine 10 rise depending on increases in the engine rotation speed while the engine output is kept constant.

If the catalyst temperature is below activation temperature, as shown in FIG. 6, depending on the deviation of the present catalyst temperature from its activation temperature, the basic driving point X is transferred to a driving point with a high rotation speed such as X' on the same output line.

In such a way, while maintaining the required electrical output, it is possible to raise the temperature of the exhaust temperature and quickly raise the temperature of the catalyst 19 to purify the exhaust gas.

If driving is continued at driving point X', the temperature of the catalyst 19 will gradually be raised, and the deviation from set temperature (activation temperature) will be reduced. Consequently the driving point is transferred to X" on the same output. When the temperature of the catalyst 19 increases (the deviation is reduced), the driving point is transferred from X" to close to X. If the temperature of the catalyst exceeds the set temperature, control of the driving point is performed so that the driving point becomes the basic driving point X.

A series hybrid electrical vehicle (SHEV) is provided with a motor 13 to drive the vehicle, an electrical generator 11, an engine 10 to drive the generator, a control device 16 to control both the above and the various sensors. From the installation space of the layout, it can be seen that sometimes the components above are placed in the same space as the engine 10 used to drive the generator. For example in the case of a gasoline car, this would mean the engine room and would expose them to a high temperature environment.

Since the functional temperature limit of the various sensors and microcomputer used by the control device 16 is not very high, it is desirable to ensure that the temperature of the components remains below the functional limit.

In other words, this results in the exhaust temperature condition required for the engine being relatively low.

Figure 8:
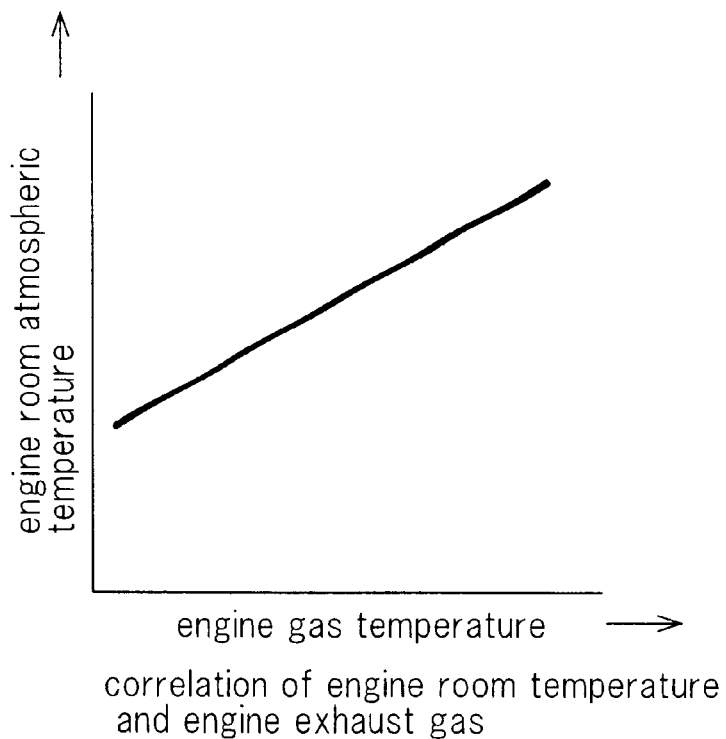
FIG. 8 shows the correlation between engine exhaust gas temperature and engine room temperature.

As shown in FIG. 8, the atmospheric temperature in the engine room is largely dependent on the temperature of the exhaust gas. The relationship between the two is roughly proportional. Therefore if the temperature of the exhaust gas is reduced, it is possible to reduce the temperature of the engine room. Consequently the temperature of the various sensors and the microcomputer used in the control device 16 is reduced.

Incidentally in the engine driving region, the engine rotation speed at the minimum exhaust gas temperature point at constant engine output as shown in FIG. 3 and the engine rotation speed at the optimal fuel consumption point at equal engine output as shown in FIG. 4 is not always the same.

Figure 7:
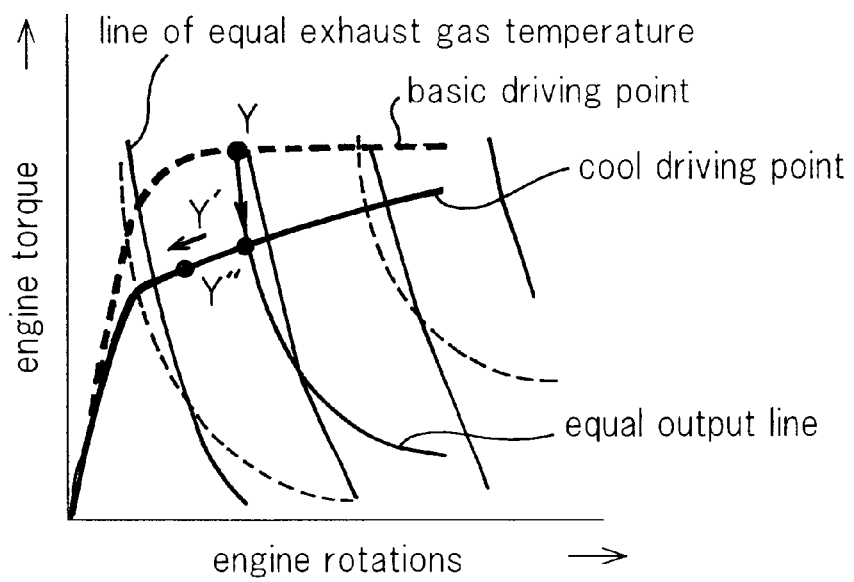
FIG. 7 shows the transition line (Y→Y'→Y") of the driving point of the generator and the engine used to drive the generator in order to efficiently lower the temperature of the exhaust gases.

FIG. 7 shows the characteristic connecting the driving point at the minimum exhaust temperature at equal output that is to say the cold driving point. In this case the engine rotation speed at the point of maximum efficiency at the basic driving point is lower than the engine rotation speed at the point of minimum exhaust gas temperature.

The characteristic as shown in FIG. 7 is controlled as shown below in order to lower the exhaust gas temperature efficiently.

If the electrical output is determined, the driving point of the engine 10 and the generator 11 is set to point Y on the basic driving point. However if the temperature of the engine room increases and the temperature of the microcomputer and sensors exceeds a set temperature, it is necessary to lower the temperature of the engine room in order to lower the temperature of the sensors.

In this case, if the driving point is transferred along the basic driving line (maximum fuel efficiency line) to a point of lower output, the exhaust gas temperature is lowered by lowering the engine output and so it is possible to lower the temperature of the engine room.

However as a result of this method, the actual electrical output is lowered with respect to the required electrical output. Thus the problem of deterioration of the battery due to over-discharge or adverse effects on the running of the vehicle arises.

Hence as shown in FIG. 7, at a constant output, if the rotation speed of the engine is slightly increased over basic driving point Y, driving pint Y' at which the engine load (generator load) is lower as a result is directed to a point lowering the exhaust gas temperature to less than basic driving point Y. When it is necessary to lower exhaust gas temperature, control is performed to transfer from basic driving point Y to driving point Y'.

In this way, while outputting the required electrical output, it is possible to lower the engine room temperature. Even if the vehicle is driven at driving point Y', when the degree of exhaust gas temperature reduction is not sufficient, engine output is reduced. That is to say, transfer in the direction of Y" is gradually made while on a cool driving point connecting the driving points which make up the minimum exhaust gas temperature at an equal output.

As a result the required electrical output is not greatly reduced and the temperature of the exhaust gas of the engine is reduced to maximum efficiency.

Figure 9:
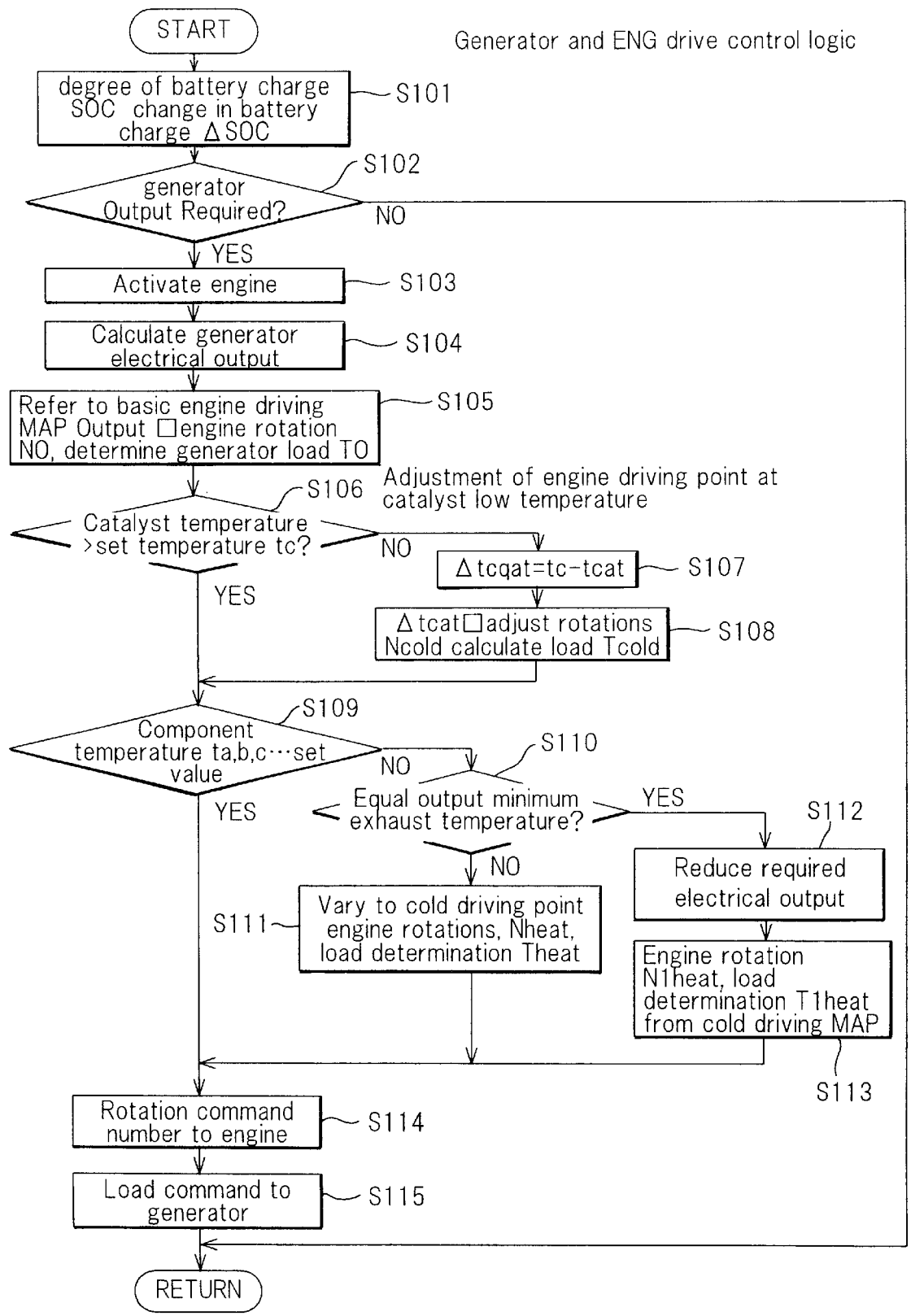
FIG. 9 is a flowchart of the control comprising embodiment 1 of the present invention.

FIG. 9 is a flowchart showing the contents of control of the present invention as explained above.

Firstly in a step 101, the degree of charge (SOC) of the battery 12 (existing charge) and the change ($\Delta$SOC) in the charge of the battery 12 and the like are read.

In a step 102, it is determined whether or not the necessity exists to produce electricity on the basis on this information. If it is not necessary, the process is returned (that is to say the process returns to the main control routine). If it is determined that electricity needs to be produced, the process proceeds to a step 103.

In the step 103, the engine used for driving the electrical generator is activated.

In a step 104, the required electrical output (PO) is determined from (SOC), ($\Delta$SOC) and vehicle speed. The method of determining the required electrical output does not differ from the prior art.

In a step 105, the generator load value (torque TO) which corresponds to the engine load and the engine rotation speed command value NO, which can produce the required electrical output, is set while referring to basic driving MAP (for example the map in FIG. 5) which is set beforehand in the control device 16.

The load of the generator 11 corresponds to the driving resistance of the generator 11. This load corresponds to the command value of the electrical output control factor of the generator 11 which is necessary to produce the required electrical output (PO) at engine rotation speed at that time. That is to say it corresponds to the output current value or the terminal voltage.

Next in order to determine the exhaust gas temperature characteristics required for the engine, firstly in a step 106, it is determined whether the current temperature of the catalyst 19 is higher or lower than the set temperature at which the catalyst 19 displays purification capability. If the temperature is higher the process proceeds to a step 109.

On the contrary when the temperature has not reached the set temperature (is lower), the process proceeds to a step 107 where the temperature differential ($\Delta t$) of the set temperature (tc) and the catalyst temperature (tcat) is calculated. Next in a step 108, the engine rotation speed command value NO and the generator load command value TO are revised to a driving point predetermined at each output corresponding to the temperature differential. In other words, in order to increase the exhaust gas temperature, the engine rotation command value is changed to (Ncold) and the generator load command value is changed to (Tcold) and the process proceeds to step 109.

Hence the driving point X in FIG. 5 is varied to X' depending on ($\Delta t$). Variation to X" occurs depending on reductions in ($\Delta t$) after that point in time. Further reductions in ($\Delta t$) gradually return the driving point to driving point X.

In the step 109, it is determined whether the various temperatures (ta), (tb), (tc) . . . of the components such as the various sensors or the microcomputer or the like has reached the set temperature (tah), (tbh), (tch) . . . which represent the functional limit of each component.

If the temperature has not been reached, in other words when it is not necessary to lower the exhaust gas temperature, the process proceeds to steps 114 and 115. The generator load command value and the engine rotation command value determined in the step 105 or the step 108 are returned respectively as driving command values.

In the step 109, when the temperature of each component exceeds a set temperature, the process proceeds past the step 110 in order to reduce the exhaust temperature.

In the step 110, it is determined whether or not the present driving point is at the minimum exhaust gas temperature point, that is to say, cool driving point.

If the present driving point is not at the cool driving point, the process proceeds to a step 111 at which the driving point command value is converted to the engine rotation speed (Nheat), which is the cool driving point pre-stored in the control device 16 at each output, and the generator load (Theat). In other words, for example, control is performed to convert driving point Y in FIG. 7 to Y'.

On the other hand, in the step 110, if it is determined that driving is already taking place at the cool driving point, the required electrical output (PO) is varied to electrical output (P1) in which output is lowered by a minimum fixed value ($\Delta$P). Then at the cool driving point the engine rotation speed (N1heat) and the generator load (T1heat) are determined. In other words for example, driving point Y' in FIG. 7 is transferred to Y" and if the temperature of each component still exceeds a set temperature, the output continues to be lowered along the driving line joined to the cool driving point.

The values determined in the steps 111 and 113 are output as driving command values in the steps 114 and 115 and the process is returned.

Hence in this embodiment, driving is performed at basically a high efficient driving point by operating the generator and the engine used to drive the generator at a level corresponding to the required electrical output. On the other hand, when there is a difference between the required conditions of the temperature of the exhaust gas and the basic driving point as when the temperature of the catalyst 19 is low and in an inactive state, or the component temperature in the engine room is high, control is performed to change to a driving point corresponding to the necessary exhaust gas temperature while maintaining the required electrical output.

As a result the required electrical output is not reduced, and it is possible to suitably control each component temperature condition. The overall result is that noise and vibration can be reduced while maintaining the appropriate mobility of the vehicle. Furthermore as the battery is not over charged, there is no problem as regards its deterioration. It is also possible to activate the catalyst quickly after the activation of the engine, to improve exhaust gas emissions and thermally protect all components.

Although in the present embodiment the driving point is varied depending on the temperature of the catalyst 19 and depending on the temperature of the peripheral components of the engine such as the microcomputer and the various sensors, it is not limited in this respect. For example the driving point could be varied depending on only one of the catalyst temperature or the temperature of the components such as the microcomputer or the various sensors.

In other words, it is possible to shorten the process to either steps 106–108 or steps 109–113 in the flowchart in FIG. 9.

Next another embodiment of the present invention will be explained.

The outline of the control of the present embodiment will be explained with reference to FIG. 10. This embodiment demonstrates that catalyst temperature is a correlation of time elapsed after engine activation. After activation of the engine required electrical output, if a driving point is set which raises of the exhaust gas temperature, the driving point is controlled so that it converges with the basic driving point depending on time elapsed after engine activation.

Figure 10:
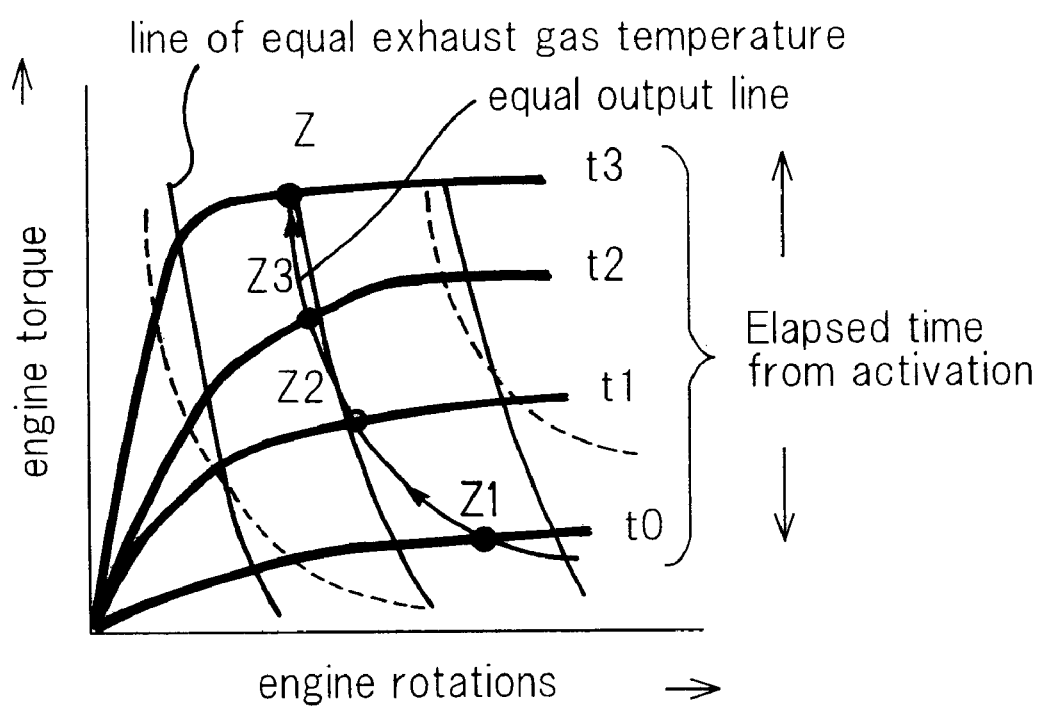
FIG. 10 is an explanatory figure showing the driving point set corresponding to elapsed time since engine activation for each output.

As shown in FIG. 10, if driving points which are set depending on time elapsed after activation for each output are joined, it is possible to draw a driving line at each after activation elapsed time (t0, t1, t2 . . . ).

For example at after activation elapsed time (t1), driving is controlled to a point on the line (t1), for example Z2, at which the required output (electrical output) is obtained. As a result, depending on the post-activation elapsed time, it is possible to control the exhaust gas temperature so that the catalyst 19 displays early activation of purification characteristics while maintaining the required electrical output.

The actual control of the generator 11 and the engine 10 will be explained on the basis of the flowchart in FIG. 11.

The steps 201–204 and the step 109 are the same as the steps 101–104 and the step 109 in FIG. 9 and will not be explained here.

In the step 205 which occurs after engine activation, at time (t0) after activation, reference is made to the driving point MAP of each output preset in the control device 16 and generator load (Tt0) and engine rotation speed (Nt0) which correspond to the required output (required electrical output) are determined.

In the step 206, the time (t start) after activation is read, and in the steps 207, 208 and 210, it is determined how much time has elapsed after the activation.

In the steps 209, 211 and 212, referring to FIG. 10, the preset generator load and preset engine rotation speed corresponding to the required electrical output are determined at each elapsed time after activation as command values.

In other words, as shown in FIG. 10, the driving point is controlled so that while meeting the required output, gradual transition from driving point Z1, at which maximum increase in the exhaust gas temperature is possible, to points Z2, Z3 and Z is made depending on the amount of time elapsed after activation. In other words, depending on the amount of time elapsed after activation (that is to say the degree to which catalyst activation is being reached), transition is made from a driving point at which increases in the exhaust gas temperature at an equal output are at a maximum to driving point (Z2, Z3) where the exhaust gas temperature reduces or driving points at which maximum fuel efficiency is achieved (Z).

After these steps 207, 209, 211 and 212, processing as in embodiment 1 (steps 109–115) takes place.

In this way, on one hand, efficient driving can be performed corresponding to the required electrical output and also early activation of catalyst can be achieved after engine activation.

As driving point is controlled on the basis of time elapsed after activation, on comparison with embodiment 1, the temperature sensor 20 can be dispensed with which reduces the cost and further simplifies computing.

Figure 11:
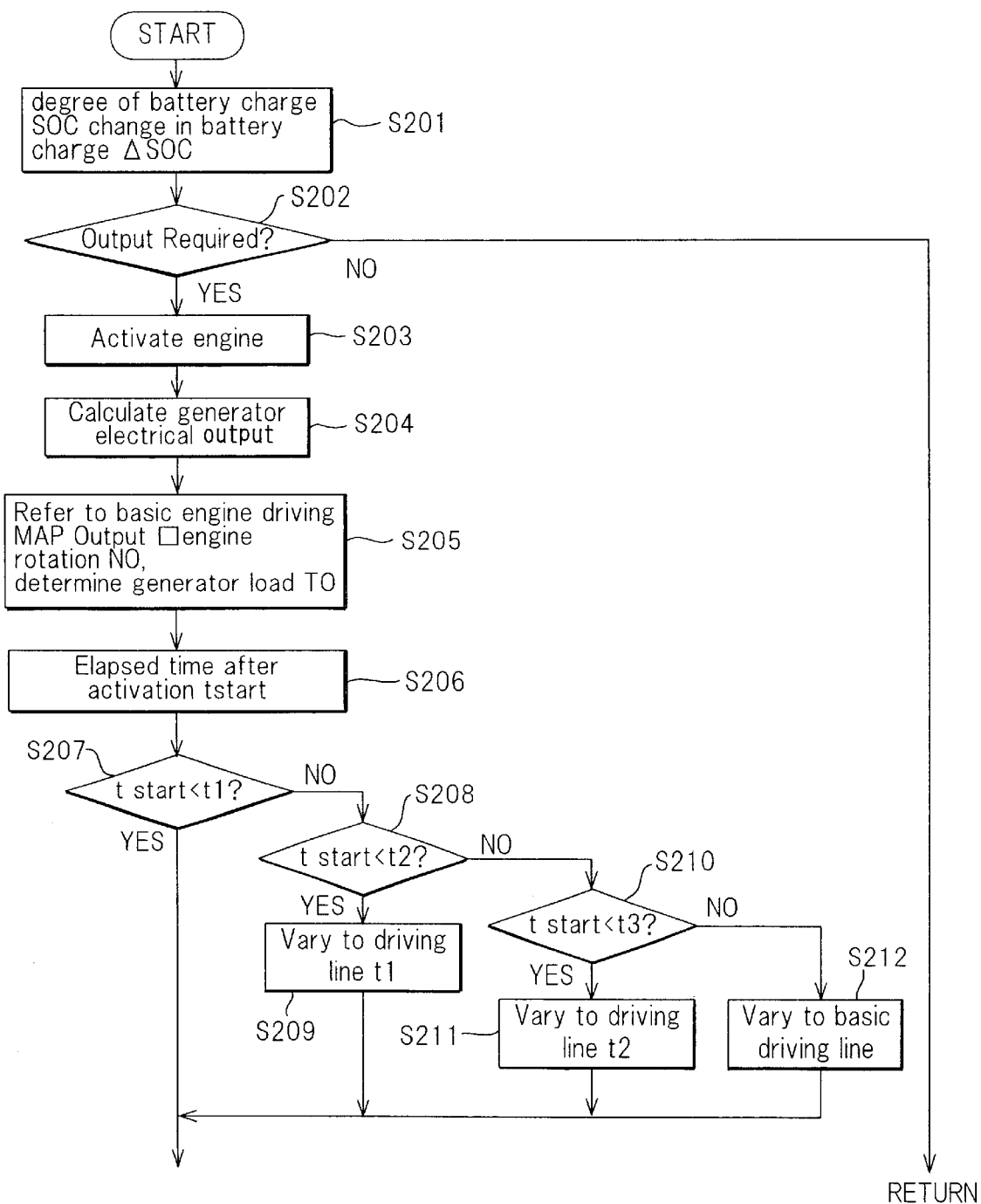
FIG. 11 is a flowchart of the control comprising embodiment 2 of the present invention.

As necessary, the steps 109–113 after the steps 206–212 in the flow chart in FIG. 11 can be dispensed with.

In all the embodiments above, the variation of the driving point was explained on the basis of temperature conditions of the components (sensors or microcomputer) in the engine room or the temperature condition of the exhaust gas purification catalyst. However while maintaining the required electrical output, it is possible to vary the driving point in order to advance the engine warming up characteristic heater depending on the engine water temperature or control the engine water coolant temperature or the driving motor temperature to lower than a set temperature.

The present invention is not limited to the embodiments above and within the scope of the stated claims, it is clear that various variations exist to the person skilled in the art.

What is claimed:

1. A generator control device for a hybrid automobile which includes an electrical motor used to drive the automobile, a battery which supplies electricity to said electrical motor, a generator which supplies electricity to said electrical motor and to said battery, an exhaust gas purification catalyst disposed in an exhaust passage, and an engine which drives said generator, the generator control device comprising:

a controller which controls output of the engine at least when a charge of the battery falls below a set value so that the generator is driven and an amount of electrical output meets a required electrical output wherein said controller includes a microcomputer and is programmed to:

maintain an engine output which is equal to an engine output at a basic driving point when a temperature of the catalyst is lower than a set temperature, said basic driving point is a point of optimal efficiency of the engine, and vary a rotation speed of said engine and a torque of said engine as to raise the temperature of the catalyst when the temperature of the catalyst is lower than said set temperature, while maintaining a constant engine output by an increase of the engine rotation speed and a decrease of the engine load, so the temperature of the catalyst is raised.

2. A generator control device according to claim 1, wherein said controller, on comparison with an engine exhaust gas temperature at maximum fuel efficiency driving conditions at an equal engine output, employs different variation characteristics with respect to the rotation speed when a required exhaust gas temperature is high and when the required exhaust gas temperature is low.

3. A generator control device according to claim 2, wherein said controller, as an exhaust gas temperature condition of said engine, varies the load on the generator towards a rotation speed that increases the exhaust gas temperature while maintaining a constant engine output when the temperature of the catalyst is lower than the set value.

4. A generator control device according to claim 3, wherein said controller varies the load on the generator depending on a deviation of the temperature of said catalyst from the set temperature.

5. A generator control device according to claim 4, wherein said controller estimates the catalyst temperature on an elapsed time after the activation of the engine.

6. A generator control device according to claim 5, wherein said controller varies the generator load towards a rotation speed that lowers the exhaust gas temperature at an equal engine output when the temperature of peripheral engine components of an engine room are higher than a set temperature.

7. A generator control device according to claim 6, wherein said controller, when the engine exhaust gas temperature is not lowered sufficiently to reach the set temperature even if the load on said generator is varied towards a rotation speed that lowers the exhaust gas temperature, said controller gradually reduces the engine output while maintaining a rotation speed to minimize the exhaust gas temperature.

8. A generator control device which controls output of an engine to drive a generator when a charge of a battery, which supplies electricity to an electrical motor to drive an automobile, is lower than a set value, so that electrical output achieves required electrical output, the generator control device comprising:

a microcomputer that is programmed to:

maintain an engine output which is equal to an engine output at a basic driving point when a temperature of an exhaust gas purification catalyst disposed in an exhaust passage is lower than a set temperature, said basic driving point is a point of optimal efficiency of the engine, determine required conditions of engine exhaust gas temperature, and vary a rotation speed of said engine and a torque of said engine as to raise the temperature of the catalyst when the temperature of the catalyst is lower than said set temperature by an increase of the engine rotation speed and a decrease of the engine load at a maximum fuel efficiency such that the required conditions of engine exhaust gas temperature are achieved.

9. A method of operating a generator control device of a series hybrid electrical vehicle that includes an electric motor used to drive the automobile, a battery which supplies electricity to said electric motor, a generator which supplies electricity to said electric motor and to said battery, an exhaust gas purification catalyst disposed in an exhaust passage and an engine which drives said generator, the method comprising:

maintaining an engine output which is equal to an engine output at a basic driving point when a temperature of an exhaust gas purification catalyst disposed in an exhaust passage is lower than a set temperature, said basic driving point is a point of optimal efficiency of the engine; and varying a rotation speed of said engine and a torque of said engine as to raise the temperature of the catalyst when the temperature of the catalyst is lower than said set temperature, while maintaining a constant engine output by an increase of the engine rotation speed and a decrease of the engine load, so the temperature of the catalyst is raised.

10. The method according to claim 9, further comprising:

when said catalyst temperature is lower than said set temperature, calculating a temperature differential of said set temperature and said catalyst temperature, and wherein said varying step further comprises sending an engine rotation command to the engine to adjust a rotation of the engine when said catalyst temperature is lower than said set temperature.

11. The method according to claim 10, wherein said maintaining step comprises:

sending a generator load command to the generator to adjust the load on the generator to increase said catalyst temperature.

12. The method according to claim 9, further comprising:

determining whether a temperature of a first sensor has reached a temperature corresponding to a functional limit of said first sensor when said catalyst temperature is greater than said set temperature.

13. The method according to claim 12, further comprising:

reducing required electrical output when said temperature corresponding to a functional limit equals an output minimum exhaust temperature;

determining engine rotation speed and generator load values; and sending command signals to the engine and the generator corresponding to said engine rotation speed and generator load values.

14. The method according to claim 9, further comprising:

reading a degree of charge of the battery and a change in the charge of the battery;

determining whether electricity is to be produced, wherein when it is determined that electricity is to be produced, activating the generator, and determining a generator electrical output; and setting a generator load value and an engine rotation speed command based on predetermined basic driving points that represent maximum fuel efficiency on the basis of engine rotation speed and engine load.

15. The method according to claim 14, wherein said generator electrical output is determined corresponding to said degree of charge, said change in the charge of the battery, and vehicle speed.

16. The method according to claim 14, further comprising:

determining a first and second elapsed time after said activation;

determining engine rotation speed and engine load corresponding to the generator electrical output at said first and second elapsed times; and wherein said varying comprises varying the load on the generator to change the rotation speed of the engine on a basis of the engine rotation speed and engine load determinations at said first and second elapsed times to maximize fuel efficient operation.

* * * * *